United States Patent [19]

Buss

[11] Patent Number: 4,629,383
[45] Date of Patent: Dec. 16, 1986

[54] VERTICALLY STACKABLE LUGGAGE CART VENDING MACHINE

[76] Inventor: Jack Buss, 660 S. 305th St., Federal Way, Wash. 98003

[21] Appl. No.: 570,856

[22] Filed: Jan. 16, 1984

[51] Int. Cl.⁴ .......................... B65G 57/30; E04H 6/14
[52] U.S. Cl. ...................................... 414/93; 194/905; 221/84; 414/251
[58] Field of Search .............. 194/4 R, 4 B, 4 C, 4 D, 194/4 E, 905; 221/77, 82–86, 312 A; 186/52; 414/93, 248, 251; 280/33.99 C, 33.99 T

[56] References Cited

U.S. PATENT DOCUMENTS

| | | | |
|---|---|---|---|
| 581,803 | 5/1897 | Armstrong | 414/251 |
| 1,881,175 | 10/1932 | DuGrenier . | |
| 2,286,165 | 6/1942 | Balton | 214/85 |
| 2,753,970 | 7/1956 | Breeler | 194/40 |
| 2,818,955 | 1/1958 | Stackhouse | 194/4 |
| 3,160,292 | 12/1964 | Albrecht | 280/33.99 T X |
| 3,164,294 | 1/1965 | Phillips et al. | 221/84 |
| 3,194,377 | 7/1965 | Fischbach et al. | 194/4 R |
| 3,283,868 | 11/1966 | Kuhns et al. | 194/4 R |
| 3,561,567 | 2/1971 | Bradley | 186/52 |
| 3,608,775 | 9/1971 | Offutt | 221/84 |

Primary Examiner—F. J. Bartuska
Attorney, Agent, or Firm—Seed and Berry

[57] ABSTRACT

A luggage cart dispensing machine having a vertically oriented rotatable conveyor assembly which defines a path for the movement of the luggage carts, a series of pivotally attached vanes extending from the conveyor assembly, the vanes forming an interlocking engagement with the luggage carts to lift and hold the luggage carts in consecutive alignment, and a vertically oriented stationary bar which cooperates with the conveyor assembly to prevent the lateral release of the luggage carts. The dispensing machine also utilizes a drive mechanism engaged with the conveyor assembly which may be actuated by a coin-operated control or a switch, and is operable in a reversible manner.

2 Claims, 4 Drawing Figures

0
VERTICALLY STACKABLE LUGGAGE CART VENDING MACHINE

TECHNICAL FIELD

The present invention relates to luggage cart vending machines in general, and more specifically, to a device and system for the vertical storage and dispensing of luggage carts.

BACKGROUND ART

The conventional method of dispensing luggage carts employs a horizontally disposed track mounted within an enclosure and adapted to retain a number of luggage carts. The carts are released one at a time upon the insertion of a coin, as in U.S. Pat. No. 2,818,955. However, since the cost of each square foot of floor space in most major airports is at a premium, this conventional method represents an inefficient manner of providing the public with portable luggage cart service.

Consequently, there exists a need in the art for a cost-effective means for dispensing luggage carts in airports and other transportation centers where the efficient use of space is an important consideration. The present invention fulfills this need, and further provides other related advantages.

DISCLOSURE OF INVENTION

The present invention comprehends a luggage cart dispensing system utilizing a vertically oriented, rotatable conveyor which defines a path for the movement of luggage carts along with a series of pivotally attached vanes which extend from the conveyor. The vanes engage the luggage carts to lift and hold the luggage carts in consecutive alignment. The luggage cart dispensing system also utilizes a vertically oriented stationary bar which engages and directs the luggage carts upon their insertion into the system and cooperates with the pivotally attached vanes to prevent the lateral release of the luggage carts. In addition, the dispensing system is provided with a reversible drive mechanism which moves the conveyor in one direction by a coin-operated control and in an opposite direction by a switch. The conveyor, stationary bar, and drive mechanism of the system are supported by a frame structure and enclosed in a housing, the housing adapted to enclose the conveyor, the stationary bar, and the drive mechanism. This housing may have a transparent wall for for the visual observation of the luggage carts.

BEST MODE FOR CARRYING OUT THE INVENTION

Figures 1, 2:
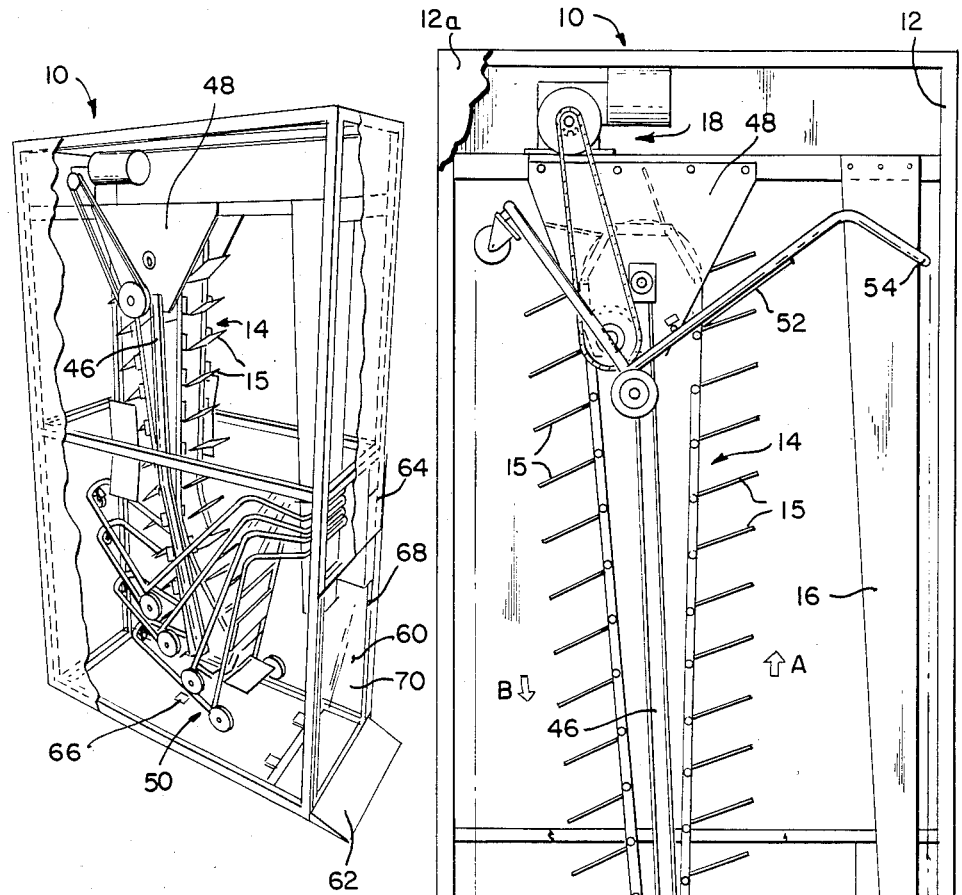
FIG. 1 is a fragmenary isometric view of the luggage cart dispensing system embodied in the present invention.
FIG. 2 is an enlarged fragmentary side elevational view of the system of FIG. 1.

As shown in the drawings for purposes of illustration, FIG. 1 shows a dispensing system 10 in its stationary and operative position.

Referring now to FIG. 2, a dispensing system 10 includes a frame 12 which supports a vertically disposed conveyor 14 in an elevated position, a stationary bar 16, and a drive mechanism 18. The system is enclosed by panels 12(a) secured to and covering the frame. The conveyor assembly 14 defines a vertical path for the movement of a luggage cart 50 in the directions shown by arrows A and B. The conveyor assembly includes a pair of vertically oriented, spaced apart, elongated supports 46 secured at their upper ends to plates 48 which are secured, in turn, to an upper cross-beam of the frame 12.

Figure 3:
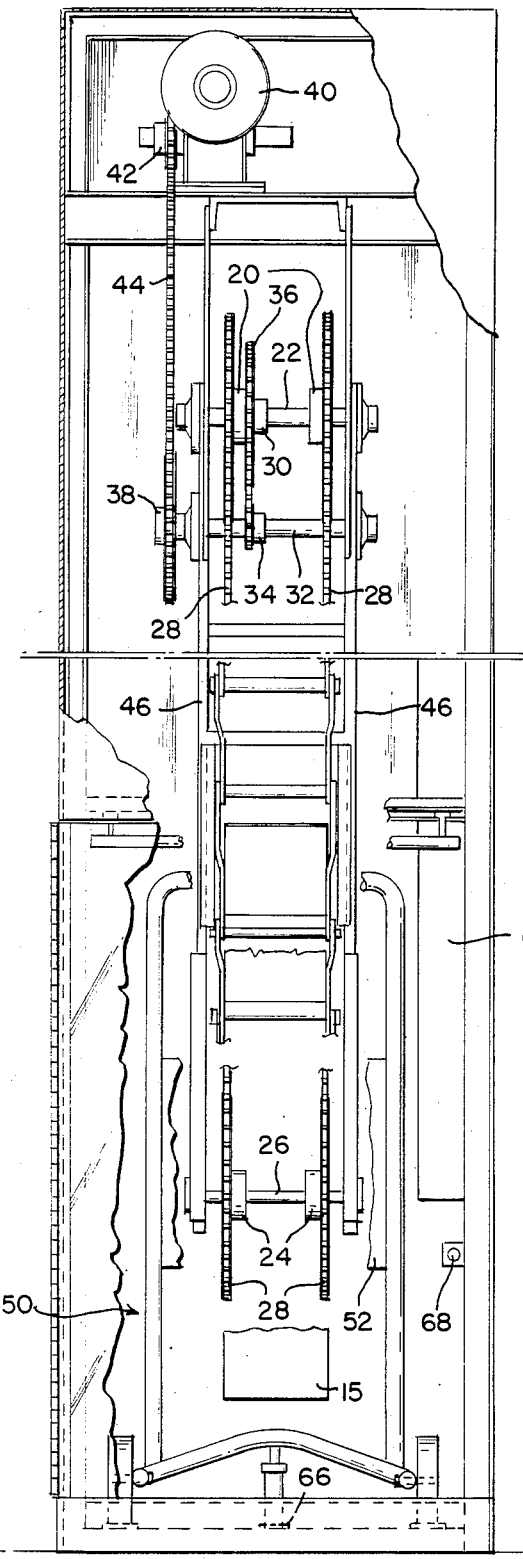
FIG. 3 is an enlarged fragmentary front elevational view of the system of FIG. 1.

Turning to FIG. 3, a set of spaced apart upper parallel sprockets 20 are fixedly attached to a shaft rotatably mounted near the upper end of and between the supports 46. A corresponding set of lower parallel sprockets 24, positioned off-center from upper sprockets 20, are fixedly attached to a horizontal shaft 26 rotatably mounted near the lower end of and between the supports 46. Trained about and extending between upper parallel sprockets 20 and lower parallel sprockets 24 are a pair of link belts 28. A series of pivotally attached vanes 15 are attached to and extend between the pair of link belts 28. The vanes 15 pivot in a counter-clockwise direction only. In addition to parallel sprockets 20 on the shaft 22, another sprocket 30 is fixedly attached to shaft 22 between sprockets 20. Spaced from and parallel to shaft 22 is another rotatably mounted horizontal shaft 32 with a fixedly attached sprocket 34 in line with sprocket 30. A link belt 36 is trained about sprockets 30 and 34, respectively. Attached to one end of shaft 32 near its outer end is sprocket 38. Positioned above sprocket 38 and conveyor 14 is a motor 40 mounted to the frame. Motor 40 utilizes conventional associated gearing and has a sprocket 42 which communicates with sprocket 38 by means of a link belt 44 which extends between sprocket 38 and sprocket 42. The motor 40 is operable in a reversible manner and may be energized by known means.

As shown in FIG. 2, a downwardly tapered stationary bar 16 is supported at its upper end from an upper cross-beam of frame 12. Stationary bar 16 is positioned substantially parallel to the path of movement of conveyor assembly 14 and extends downward a distance sufficient to engage the horizontally oriented handle 54 of luggage cart 50 when the cart is in an upright and standing position on the floor of stand 12.

The forward panel of housing 12 is provided with an opening 60 of a size sufficient to allow a luggage cart to be pushed fully into the interior of the stand 12. At the lower edge of opening 60 is an angled ramp 62 which acts to facilitate the placement of luggage cart 50 within the interior of stand 12. Directly opposite the opening 60 are the lower parallel sprockets 24 of conveyor assembly 14.

Prior to its initial operation, dispensing system 10 is provided with a series of luggage carts 50. The luggage carts are generally of an L-shaped configuration when viewed from the side and have a central opening formed by a continuous tubular frame. Each cart is provided with a set of three wheels and a rear plate 52 which extends between the vertical oriented parallel supports of the cart. A handle 54 is formed at the top of the frame by the parallel supports.

Figure 4:
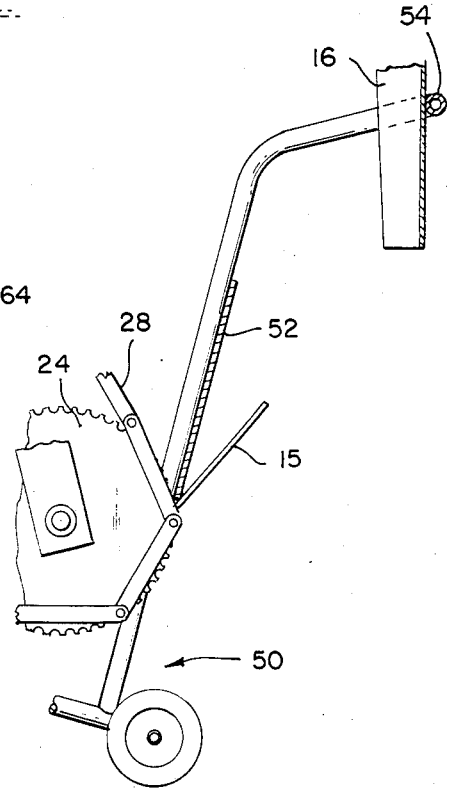
FIG. 4 is an enlarged fragmentary side elevational view of the system of FIG. 1 illustrating and showing a luggage cart being supported by a pivotally attached vane which extends from a central conveyor.

As noted above, the luggage carts to be dispensed are supported by pivotally attached vanes 15 which extend from and are securely held by conveyor assembly 14. Referring to FIG. 4, when the cart is inserted into the assembly, vane 15 engages the rear plate 52 of luggage cart 50 and the stationary bar 16 engages the inside of handle 54 of the cart to prevent the lateral release and unauthorized removal of luggage cart 50 from the dispensing system 10.

The dispensing system 10 is operable once installed and may be activated by a consumer who desires to obtain a luggage cart by inserting a coin into a coin-operated control 64 supported on and within the frame 12. The coin-operated control 64 may be of conventional design, and is electrically responsive to the insertion of a coin. Upon the insertion of a coin an electrical signal is transmitted to drive assembly 18. The motor 40 of drive assembly 18, having been energized, causes sprocket 42 to rotate, which, in turn, communicates with sprocket 38, as mentioned above. Ultimately, through the interrelationship between motor 40 and upper parallel sprocket 20 noted previously, conveyor 14 is incrementally shifted downward until vane 15 disengages from the rear plate 52 of cart 50, allowing the handle of luggage cart 50 to be pulled from the end of stationary bar 16, thereby releasing the luggage cart for use by a consumer.

For the purpose of encouraging and compensating a consumer for the replacement of carts within the dispensing system, the refunding of a coin of less value than that required to obtain a cart is contemplated. In order for consumers or airport personnel to return a cart of the dispensing system and obtain a refund, the luggage cart 50 must be pushed up ramp 62 and through opening 60 into the interior of stand 12.

As shown in FIG. 2, when cart 50 is pushed into the dispensing system, it activates switch 66 located on the floor of stand 12. Subsequently, the consumser closes door 20, which activates a second switch 68. The sequential activation of switch 66 and switch 68 serves to energize drive mechanism 18 by means of an electrical signal. The electrical signal initiated by the switches causes the motor 40 to rotate the conveyor assembly in a counterclockwise direction. Through the interrelationship noted previously, conveyor assembly 14 is incrementally shifted upward until vane 15 frictionally engages and supports the rear plate 52 of luggage cart 50. As conveyor assembly 14 continues this incremental movement, the luggage cart is liften through the engagement of rear plate 52 and is negotiated into a nesting position through the simultaneous engagement of handle 54 with stationary bar 16. This nesting arrangement provides for the least amount of vertical space to be occupied by each cart, thus allowing for a greater number of carts to be stored within each dispensing system than would otherwise be possible. As noted previously, once drive mechanism 18 terminates the incremental movement of conveyor 14, the position of each cart is maintained by the combination of the engagement of luggage cart 50 with pivotal vane 15 and stationary bar 16 until the system is actuated to deliver a cart to an authorized consumer.

Since dispensing system 10 provides for a more efficient use of floor space in congested transportation centers, it is contemplated that the dispensing system could be placed in several convenient locations within these transportation centers without having a significant adverse impact upon the relatively constant flow of passengers, operators, and baggage characteristic of modern modes of transportation.

From the foregoing, it will be appreciated that, although embodiments of the invention have been described herein for purposes of illustration, vrious modifications may be made without deviating from the spirit and scope of the invention. Accordingly, the invention is not limited except as by the appended claims.

I claim:

1. A system for vertically storing and dispensing handcarts wherein each said cart, oriented in a load-carrying position, comprises a horizontal, wheeled platform means for supporting a load, a substantially vertical frame means for vertically supporting said load and supporting a substantially horizontal handlebar means, said system comprising:

a vertically oriented, reversibly rotatable conveyor assembly for defining a vertical path of travel of said carts;

a series of vanes extending from said conveyor assembly, each vane engaging an engaging means of said cart adjacent said vane;

a substantially vertical, stationary bar means for slidably engaging and guiding said handlebar of said cart vertically;

engaging means fixed to said vertical support means of each cart, which is engageable by said conveyor vanes, while said handlebar engages said vertical bar when said cart is wheeled adjacent said conveying vanes;

drive means for rotating said conveyor means; and actuating means for engaging said drive means to dispense one cart at a time or load one cart, whereby actuating said conveyor advances said vane into engaging contact with said cart vertical support-engaging means, lifting said cart from its load-carrying position, and sliding said cart handlebar vertially upward along said guide bar means, simultaneously causing said cart to rotate into a substantially horizontal, nestable position, suitable for nesting with carts engaged by subsequent vane means, and actuating said conveyor in the opposite direction dispenses a cart by disengaging said cart from said vane and said handlebar of said cart is free of said vertical bar guide means.

2. The system of claim 1 wherein the conveyor includes a plurality of vanes for engaging said cart-engaging means on a lower portion of said cart, adjacent said conveyor, and elevating said cart while pulling and sliding said handlebar of said cart against said guide bar as the cart elevates along said vertical path.

* * * * *